(12) United States Patent
Ichikawa et al.

(10) Patent No.: US 9,676,440 B2
(45) Date of Patent: Jun. 13, 2017

(54) VEHICLE HANDLE SWITCH AND VEHICLE INCORPORATING SAME

(71) Applicant: HONDA MOTOR CO., LTD., Minato-Ku, Tokyo (JP)

(72) Inventors: Manabu Ichikawa, Wako (JP); Kota Nakahira, Wako (JP); Tomohiro Hoshi, Wako (JP); Hiroshi Hayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 14/666,735

(22) Filed: Mar. 24, 2015

(65) Prior Publication Data

US 2015/0274246 A1 Oct. 1, 2015

(30) Foreign Application Priority Data

Mar. 28, 2014 (JP) ................. 2014-070452

(51) Int. Cl.
*B62K 23/02* (2006.01)
*G05G 1/02* (2006.01)
*B62K 11/14* (2006.01)
*H01H 9/06* (2006.01)

(52) U.S. Cl.
CPC .............. *B62K 23/02* (2013.01); *B62K 11/14* (2013.01); *G05G 1/02* (2013.01); *H01H 2009/068* (2013.01); *Y10T 74/20012* (2015.01)

(58) Field of Classification Search
CPC ........ B62K 11/14; B62K 23/00; B62K 23/02; G05G 1/01; G05G 1/02; Y10T 74/20012; Y10T 74/20822; H01H 2009/068
See application file for complete search history.

(56) References Cited

U.S. PATENT DOCUMENTS

| | | | | |
|---|---|---|---|---|
| 6,631,656 B2 | 10/2003 | Ase et al. | | |
| 7,527,120 B2 * | 5/2009 | Tatewaki | ............... | B62K 11/14 180/230 |
| 8,006,798 B2 * | 8/2011 | Portelance | ............. | B62K 5/027 180/333 |
| 8,357,864 B2 * | 1/2013 | Murasawa | ............. | B60K 20/06 200/61.88 |
| 8,686,305 B2 * | 4/2014 | Kodaira | ................. | B62K 11/14 200/61.54 |

(Continued)

FOREIGN PATENT DOCUMENTS

| | | | |
|---|---|---|---|
| JP | 2002-046677 A | | 2/2002 |
| JP | 2003208831 A | * | 7/2003 |
| JP | 2003291680 A | * | 10/2003 |

*Primary Examiner* — Adam D Rogers
(74) *Attorney, Agent, or Firm* — Carrier Blackman & Associates, P.C.; Joseph P. Carrier; Anne G. Sabourin

(57) ABSTRACT

In a switch case of a handle switch of a vehicle, first to fourth operation elements are disposed on a case below an axial line of a handlebar of the vehicle. The first to third operation elements overlap with each other, when viewed in rear view, and are each disposed in such an accessible range as to be operable by a rider with a thumb in a state in which the rider puts a left hand on a handle grip attached to the handlebar. The fourth operation element is provided on the center side of the vehicle body in the direction along the axial line. Such vehicle handle switch allows improvement in the operability for a rider.

17 Claims, 11 Drawing Sheets

(56) References Cited

U.S. PATENT DOCUMENTS

| | | | | |
|---|---|---|---|---|
| 9,018,551 B2* | 4/2015 | Nakada | ............... | B62K 23/02 |
| | | | | 200/61.54 |
| 2003/0121763 A1* | 7/2003 | Mengoli | ............ | B62K 11/14 |
| | | | | 200/61.85 |
| 2013/0105285 A1* | 5/2013 | Nakada | ............... | B62K 23/02 |
| | | | | 200/61.54 |
| 2015/0274257 A1* | 10/2015 | Sakamoto | .......... | B60K 20/06 |
| | | | | 74/473.12 |
| 2016/0059924 A1* | 3/2016 | Watanabe | ............ | H01H 3/02 |
| | | | | 200/5 A |
| 2016/0293360 A1* | 10/2016 | Osanai | ............... | H01H 25/04 |

* cited by examiner

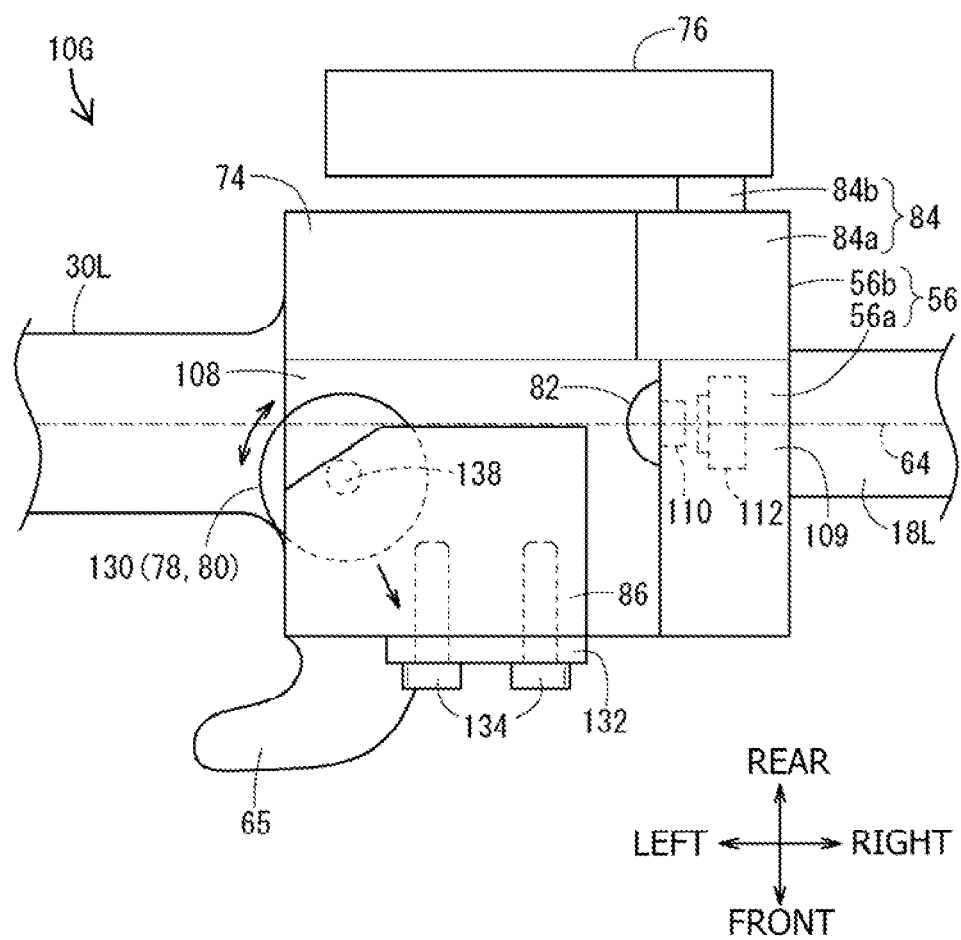

VEHICLE HANDLE SWITCH AND VEHICLE INCORPORATING SAME

CROSS-REFERENCE TO RELATED APPLICATIONS

The present invention claims priority under 35 USC 119 based on Japanese Patent Application No. 2014-070452, filed on Mar. 28, 2014. The entire subject matter of this priority document, including specification claims and drawings thereof, is incorporated by reference herein.

BACKGROUND OF THE INVENTION

1. Field of the Invention

The present invention relates to a vehicle handle switch, which is fixed to a handlebar of a vehicle together with a handle grip, and which includes a plural operation elements provided on a case configured to operate plural electrical components of the vehicle. More particularly, the present invention relates to a vehicle handle switch having a plural operation elements mounted on a case attached to a handlebar of a vehicle so as to facilitate improved operability for a rider of the vehicle, and to a vehicle incorporating the same.

2. Description of the Background Art

There is a known handle switch attached to a handlebar of a motorcycle. For example, the Japanese Patent Laid-Open No. 2002-46677 discloses a handle switch including a larger number of switches attached to a handlebar of a motorcycle.

In the handle switch including a large number of switches, the switches are disposed at positions remote from the handle grip. Therefore, it is desired to improve the handle switch so that a rider can easily carry out operation to plural switches while grasping the handle grip.

The present invention is made in view of the above-described background circumstances, and it is one of the objects of the present invention to provide a vehicle handle switch allowing improvement in the operability for the rider.

SUMMARY OF THE INVENTION

Reference numbers are included in the following description corresponding to the reference numbers used in the drawings. Such reference numbers are provided for purposes of illustration, and are not intended to limit the invention.

In order to achieve the above objects, a vehicle handle switch (10A to 10G) according to the present invention is a vehicle handle switch (10A to 10G) that is fixed to a handlebar (18L) of a vehicle (12) together with a handle grip (30L) and includes a plurality of operation elements (65 to 72, 76 to 82) that are to operate a plurality of electrical components (28, 48, 50) of the vehicle (12) and are provided on a case (56), and has the following characteristics.

First characteristic: the first operation element (76) is provided below the handlebar (18L) on the case (56), and the second operation element (78) is provided on a front side of the case (56) with respect to the vehicle (12) relative to the first operation element (76) across a predetermined space (108) from the first operation element (76) (i.e., second operation element (78) is provided at a predetermined distance from the first operation element (76)). In this case, the second operation element (78) overlaps with the first operation element (76) in rear view of the vehicle (12), and the first operation element (76) and the second operation element (78) are disposed in such a range as to be operable by a rider (13) of the vehicle (12) with a thumb (13b) in a state in which the rider (13) puts a hand (13a) on the handle grip (30L).

Second characteristic: the first operation element (76) is provided on a rear side of the case (56) relative to the vehicle (12) on a lower side relative to an axial line (64) of the handlebar (18L), and the second operation element (78) is provided on a front side of the case (56) relative to the vehicle (12) on a lower side relative to the axial line (64) of the handlebar (18L).

Third characteristic: the first operation element (76) detects that a state of the first operation element (76) is in an operated state in which the rider (13) has operated the first operation element (76) with the thumb (13b) when being displaced toward the front side of the vehicle (12), and does not detect the operated state when being displaced toward a rear side of the vehicle (12).

Fourth characteristic: the case (56) has a first attachment part (84) to which the first operation element (76) is attached, and the first attachment part (84) is disposed above the first operation element (76) in the case (56) or on a center side of the vehicle (12) in a direction along an axial line (64) of the handlebar (18L).

Fifth characteristic: the case (56) has a second attachment part (86) to which the second operation element (78) is attached, and the second attachment part (86) has a first inclined surface (120) inclined toward a rear side in a direction toward an upper side of the vehicle (12). Furthermore, the second operation element (78) is attached to the second attachment part (86) along the first inclined surface (120).

Sixth characteristic: the case (56) has a second attachment part (86) to which the second operation element (78) is attached, and the second attachment part (86) has a second inclined surface (122) inclined toward a rear side of the vehicle (12) with respect to an axial line (64) of the handlebar (18L) in a direction toward the center of the vehicle (12) along the axial line (64). Furthermore, the second operation element (78) is attached to the second attachment part (86) along the second inclined surface (122).

Seventh characteristic: the case (56) has a second attachment part (86) to which the second operation element (78) is attached, and the second attachment part (86) is allowed to be attached and detached to and from the case (56) integrally with the second operation element (78).

Eighth characteristic: the case (56) further has the third operation element (80) provided at a center of the second operation element (78).

Ninth characteristic: the case (56) further has, between the first operation element (76) and the second operation element (78), the fourth operation element (82) provided on a center side of the vehicle (12) in a direction along an axial line (64) of the handlebar (18L) in the case (56).

Tenth characteristic: the second operation element (78) is a rotary switch (127, 130) attached to a rotation axis (126, 138) different from an axial line (64) of the handlebar (18L) and allows operation of the electrical component (28, 48, 50) corresponding to the second operation element (78) by rotating around the rotation axis (126, 138).

Effects of the Invention

According to the first characteristic of the present invention, the first operation element and the second operation element overlap with each other when viewed in the rear view of the vehicle, and are each disposed in such a range as to be operable with the thumb in the state in which the rider puts the hand on the handle grip. Since the first operation element and the second operation element are provided near the handle grip, as discussed above, the operability of the first operation element and the second operation element for the rider is favorable. Therefore, according to the first characteristic, the operability of the handle switch for the rider can be improved.

According to the second characteristic of the present invention, on the lower side relative to the axial line of the handlebar in the case, the first operation element is provided on the rear side of the vehicle and the second operation element is provided on the front side of the vehicle. Such arrangement of the first and second operation elements allows the rider to definitely distinguish the position of the first operation element from the position of the second operation element. Thus, the operability can be further improved.

According to the third characteristic of the present invention, even when a finger (thumb) of the rider touches the first operation element from its rear side (vehicle front side) while operation of the second operation element, the operation of the first operation element is avoided from being placed in the operated state, and thus erroneous operation is suppressed.

According to the fourth characteristic of the present invention, the first attachment part does not exist in the space between the first operation element and the second operation element, which facilitates insertion of the thumb of the rider into this space. As a result, the operability of the second operation element can be improved.

According to the fifth characteristic of the present invention, the second operation element is attached to the first inclined surface inclined toward the rear side in the direction toward the upper side of the vehicle. This facilitates insertion of the thumb into the space between the first operation element and the second operation element. This can further improve the operability of the second operation element.

According to the sixth characteristic of the present invention, the second operation element is attached to the second inclined surface inclined toward the rear side with respect to the axial line of the handlebar in the direction toward the center of the vehicle. This facilitates insertion of the thumb into the space between the first operation element and the second operation element. Also in this case, the operability of the second operation element can be improved.

According to the seventh characteristic of the present invention, the second attachment part and the second operation element can be integrally attached and detached to and from the case. Therefore, in the case in which the second operation element is unnecessary, the second attachment part and the second operation element may be removed from the case. This allows the vehicle handle switch to have a compact configuration.

According to the eighth characteristic of the present invention, the third operation element is provided at the center of the second operation element, which can compactly dispose the plural operation elements.

According to the ninth characteristic of the present invention, in the case, the fourth operation element is provided on the center side of the vehicle between the first operation element and the second operation element. This can compactly dispose the plural operation elements.

According to the tenth characteristic of the present invention, since the second operation element is the rotary switch, the function of the electrical component corresponding to the second operation element can be easily selected and this electrical component can be operated by rotating the rotary switch around the rotation axis. Furthermore, since the rotation axis is an axis different from the axial line of the handlebar, the rider can operate the second operation element with the thumb while firmly grasping the handle grip with the respective fingers other than the thumb.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 11 is a bottom view of the handle switch of FIG. 9.

DETAILED DESCRIPTION OF ILLUSTRATIVE EMBODIMENTS

Illustrative embodiments of vehicle handle switches according to the present invention will now be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Schematic Configuration of Motorcycle

Figure 1:
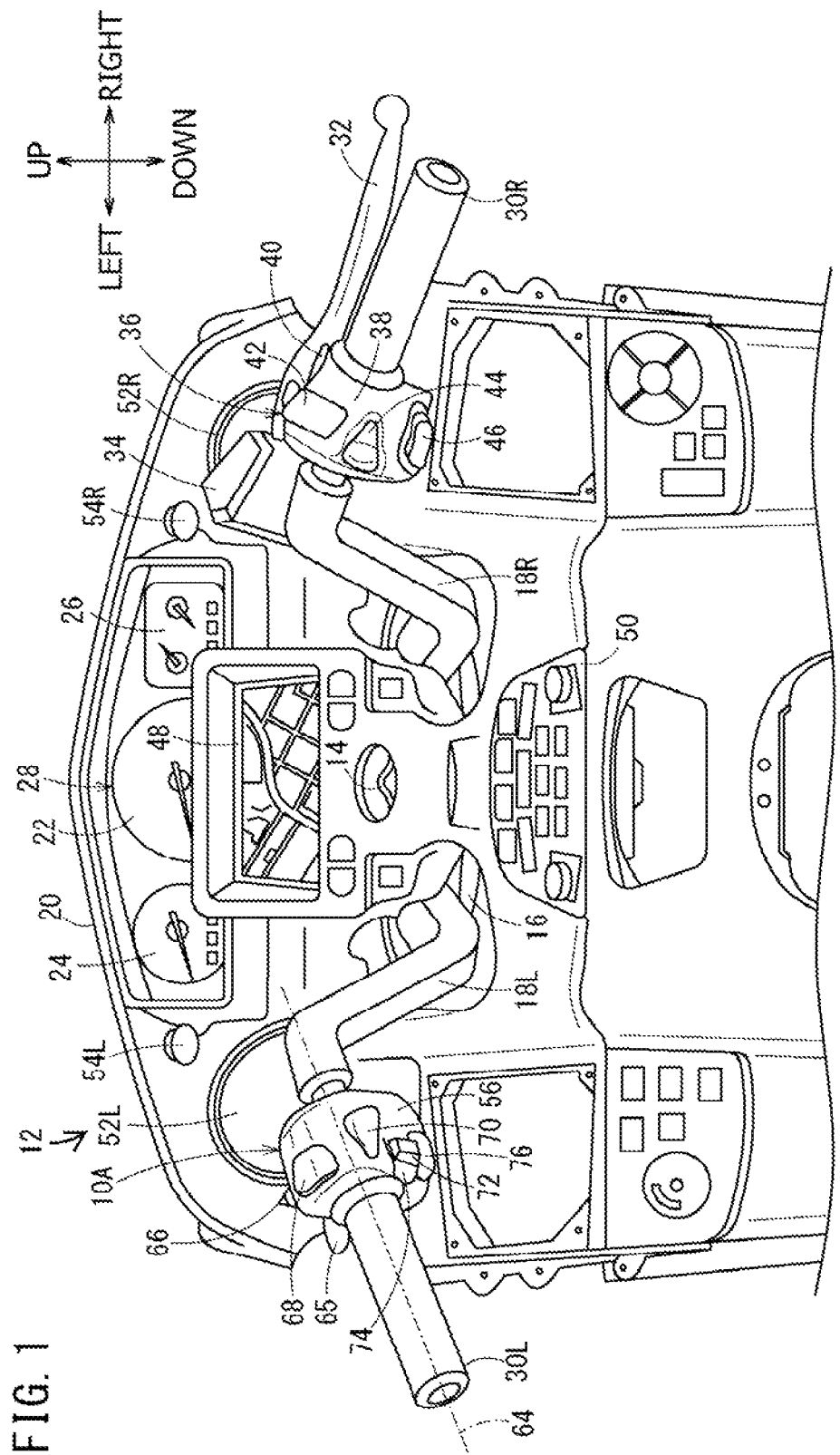
FIG. 1 is a rear view of a motorcycle equipped with a handle switch according to a first illustrative embodiment as viewed from the viewpoint of a rider.

FIG. 1 is a rear view around meters in a motorcycle (vehicle) 12 equipped with a vehicle handle switch 10A according to a first embodiment (hereinafter, referred to also as the handle switch 10A according to the first embodiment) as viewed from the viewpoint of a rider 13 (see FIG. 2) sitting on a seat. Unless particularly stated, the front, rear, left, right, upward, and downward directions of the motorcycle 12 will be described on the basis of directions as viewed from the rider 13. The handle switch 10A can be mounted not only in the motorcycle 12 but also in a four-wheeled buggy car. The handle switch 10A mounted in the motorcycle 12 will be explained in the following description.

A front wheel of the motorcycle 12 is rotatably supported by the lower ends of a pair of left and right front forks (not shown). The upper parts of the front forks are joined and fixed by a top bridge 16. A main switch 14 is attached to the top bridge 16. The top bridge 16 is pivotally attached to the vehicle body frame of the motorcycle 12 with the intermediary of a steering stem (not shown). Furthermore, a pair of left and right handlebars 18L and 18R to steer the front wheel of the motorcycle 12 are fixed to the upper end parts of the front forks.

The vehicle body front side (vehicle front side) of the handlebars 18L and 18R is covered by a cowling 20 as an exterior component. A meter system 28 having a tachometer 22, a speedometer 24, and various kinds of meters 26 such a fuel meter is disposed inside the cowling 20. The meter system 28 is a liquid crystal display and is a so-called meter display whose screen displaying can be switched based on selection by the rider 13. The display may be based on the organic EL instead of the liquid crystal. That is, the meter system 28 may include an organic EL display.

Handle grips 30L and 30R that are formed of tubular rubber or the like are attached to the handlebars 18L and 18R, respectively. The handle grips 30L and 30R are held by the rider 13 during operation of the motorcycle 12. A front wheel brake lever 32 is disposed on the vehicle body front side of the right handle grip 30R. A reserve tank 34 which retains a hydraulic oil of a hydraulic brake system is attached to the base part of the front wheel brake lever 32. Furthermore, the right handle grip 30R is supported rotatably around the axial line of the handlebar 18R and is so configured as to operate a throttle mechanism by this rotational operation.

A handle switch 36 including operation switches to operate various kinds of electrical components of the motorcycle 12 is attached to the right handlebar 18R, adjacent to the handle grip 30R. The handle switch 36 is fixed to the handlebar 18R together with the handle grip 30R and plural operation switches are provided on a box-shaped switch case 38 forming the handle switch 36.

Specifically, the switch case 38 is provided with a traveling mode changeover switch 40, an engine stop switch 42, a neutral/drive (N/D) changeover switch 44, and a starter switch 46 as the operation switches.

The traveling mode changeover switch 40 is a switch of a swing-pressing type that is attached to the vehicle body front side of the switch case 38 and returns to the initial position when a pressing force is released. Specifically, the traveling mode changeover switch 40 is operated by being pulled by the rider 13 with the forefinger of the right hand toward the near side (toward the vehicle body rear side (vehicle rear side) as the side of the rider 13), and makes a changeover between a drive mode (AT) and a manual gear-shift mode (MT) every time being operated once by the rider 13.

The engine stop switch 42 is a switch of a seesaw-switching type that keeps a position on one side or the other side unless an operating force is applied thereto. In this case, if the rider 13 operates the engine stop switch 42 to the off-side in engine operation, driving of the ignition system is stopped and the engine is brought to an emergency stop.

The N/D changeover switch 44 is a switch of a seesaw-pressing type that returns to a neutral position when a pressing force is released. Specifically, the N/D changeover switch 44 makes changeover operation between neutral (N) and first (D) of an automatic transmission through pressing of the left D-side or right N-side by the rider 13 when the motorcycle 12 is stopped.

The starter switch 46 is a switch of a pressing type disposed on the lowermost side of the switch case 38 and initiates the engine through operation by the rider 13 when the ignition switch is in the on-state and the transmission is in the neutral state.

The handle switch 10A according to the first embodiment is attached to the left handlebar 18L, adjacent to the vehicle body center side (vehicle center direction) of the handle grip 30L. The handle switch 10A includes operation switches (operation elements) to operate various kinds of electrical components including the meter system 28, a navigation display system 48, an audio unit 50, and so forth mounted in the motorcycle 12. The handle switch 10A is fixed to the handlebar 18L together with the handle grip 30L. The detailed configuration of the handle switch 10A will be described later.

The navigation display system 48 is disposed at the center of the upper side of the top bridge 16 and on the rear side of the meter system 28. On the rear side of the navigation display system 48, the audio unit 50 having functions of FM tuner, AM tuner, digital audio player unit, MD deck, cassette deck, amplifier, etc. is disposed.

Speakers 52L and 52R for middle- and low-pitched sounds to reproduce middle- and low-pitched sounds by the audio unit 50 are disposed on the left and right sides of the meter system 28. Furthermore, speakers 54L and 54R for high-pitched sounds to reproduce high-pitched sounds by the audio unit 50 are disposed between the speakers 52L and 52R, respectively, for middle- and low-pitched sounds and the meter system 28.

Detailed Configuration of Handle Switch According to First Embodiment

The detailed configuration of the handle switch 10A according to the first embodiment will be described below with reference to FIGS. 1 to 3.

The handle switch 10A has a box-shaped switch case 56 formed of a resin or the like. The switch case 56 includes a front case half body 56a that is located on the vehicle body front side and has a recess 58a having a circular arc shape when viewed in the side view (FIG. 3), and a rear case half body 56b that is located on the side of the rider 13 as the vehicle body rear side and has a recess 58b opposed to the recess 58a and having a circular arc shape. An engagement protrusion 60 extending rearward is formed on the recess 58a.

In this case, when the engagement protrusion 60 is engaged with a positioning hole (not shown) made in the handlebar 18L, and the handlebar 18L is clamped by the front case half body 56a and the rear case half body 56b, a through-hole 62 formed by the respective recesses 58a and 58b becomes substantially coaxial with an axial line 64 of the handlebar 18L. Then, the front case half body 56a and the rear case half body 56b are joined to each other by tapping screws or the like and thereby the switch case 56 is fixed at a predetermined position on the handlebar 18L. The diameter of the through-hole 62 and the diameter of the handlebar 18L are set to a substantially identical size.

The switch case 56 is provided with plural operation switches (operation elements) to operate various kinds of electrical components of the motorcycle 12, and so forth.

Specifically, on the switch case 56, a shift-up switch 65, a hazard lamp switch 66, an optical axis changeover switch 68, a horn switch 70, and a blinker switch 72 are provided in that order from the vehicle body front side toward the rider 13.

The shift-up switch 65 is provided on the front side of the front case half body 56a, and makes a shift-up of the transmission (e.g. change from first to second) every time being operated by being pulled by the rider 13 with the forefinger of a left hand 13a.

The hazard lamp switch 66 is provided on the upper side of the front case half body 56a. The state of the hazard lamp is switched between the on- and off-states by making the operation element to protrude and sink.

The optical axis changeover switch 68 is a dimmer switch of a seesaw-switching type provided on the rear side of the hazard lamp switch 66 and on the upper side of the rear case half body 56b. The optical axis of a headlight is adjusted by switching the position of the operation element to one side or the other side.

The horn switch 70 is a switch of a swing-pressing type provided on the rear surface of the rear case half body 56b and at substantially the same height as the axial line 64, and causes a horn (not shown) to be honked to invite others' attention by swinging about a swing axis (not shown).

The blinker switch 72 is provided on the rear surface of the rear case half body 56b and at a lower height than the horn switch 70, and causes a blinker (not shown) to be actuated by tilting left or right. A protruding part 74 protruding downward is formed on the rear surface side of the rear case half body 56b and the blinker switch 72 is provided on this protruding part 74.

The handle switch 10A according to the first embodiment further includes, in addition to the above-described respective operation elements (respective switches), first to fourth operation elements 76 to 82 as other operation switches on the lower side relative to the axial line 64 in the switch case 56.

The first operation element 76 is attached to the switch case 56 with the intermediary of a first attachment part 84 formed below the right side (vehicle body center side in the direction along the axial line 64) of the rear case half body 56b. Specifically, the first attachment part 84 is composed of an extending part 84a extending downward from the right side of the rear case half body 56b continuously with the protruding part 74 and a cantilever support part 84b that extends from the extending part 84a in the left direction along the axial line 64 and cantileverly supports the first operation element 76 from the front side (rear side of the first operation element 76). Therefore, the first operation element 76 is cantileverly supported by the cantilever support part 84b below the protruding part 74.

The first operation element 76 is a shift-down switch that swings about a swing axis (not shown) and forms a pair with the shift-up switch 65. In this case, a shift-down of the transmission (e.g. change from second to first) can be made every time the rider 13 operates the first operation element 76 with a thumb 13b of the left hand 13a. Therefore, when the rider 13 presses the first operation element 76 with the thumb 13b to swing it toward the vehicle body front side, the first operation element 76 detects that its state has been turned to the operated state in which the rider 13 has operated the first operation element 76 with the thumb 13b, and outputs a signal according to the detection result. Furthermore, the first operation element 76 functions to automatically return to the original position on the vehicle body rear side to avoid detection of the operated state when being released from the pressed state by the thumb 13b.

As above, the shift-up switch 65 can be operated with the forefinger and the first operation element 76 as the shift-down switch can be operated with the thumb 13b. Thus, the operability of the handle switch 10A is improved.

A second attachment part 86 is detachably attached to the front case half body 56a on the front side of the front case half body 56a, and the second operation element 78 is attached to the rear surface side of this second attachment part 86 swingably in the upward-downward direction.

Specifically, a protruding part 88 extending downward is formed on the front side of the front case half body 56a and a recess 90 fitted to the protruding part 88 is formed in the second attachment part 86. Therefore, by fastening the protruding part 88 and the second attachment part 86 by a screw 92 in the state in which the protruding part 88 is fitted to the recess 90, the second attachment part 86 can be fixed to a joining surface 93 formed at the lower corner part of the front case half body 56a on the vehicle body front side.

In this case, the second attachment part 86 is fixed to the joining surface 93 in such a manner as to be opposed to the protruding part 74 provided on the rear surface side of the rear case half body 56b, the first operation element 76, and the cantilever support part 84b.

A recess 94 having a circular arc shape is formed at a substantially center position on the rear surface side of the second attachment part 86. The second operation element 78 is a member having a substantially circular arc shape in the side view of FIG. 3. To the center part of the circular arc, a bar-shaped pressing member 96 that enters the inside of the second attachment part 86 toward the front side is connected. Furthermore, a circular member 98 that can be housed in the recess 94 is connected to the pressing member 96 and a center shaft 100 of this circular member 98 is journaled by the second attachment part 86. Moreover, at the upper arc part and lower arc part in the second operation element 78 having the circular arc shape, pressing parts 102a and 102b, respectively, having a protrusion shape are provided opposed to the rear surface of the second attachment part 86.

Figure 3:
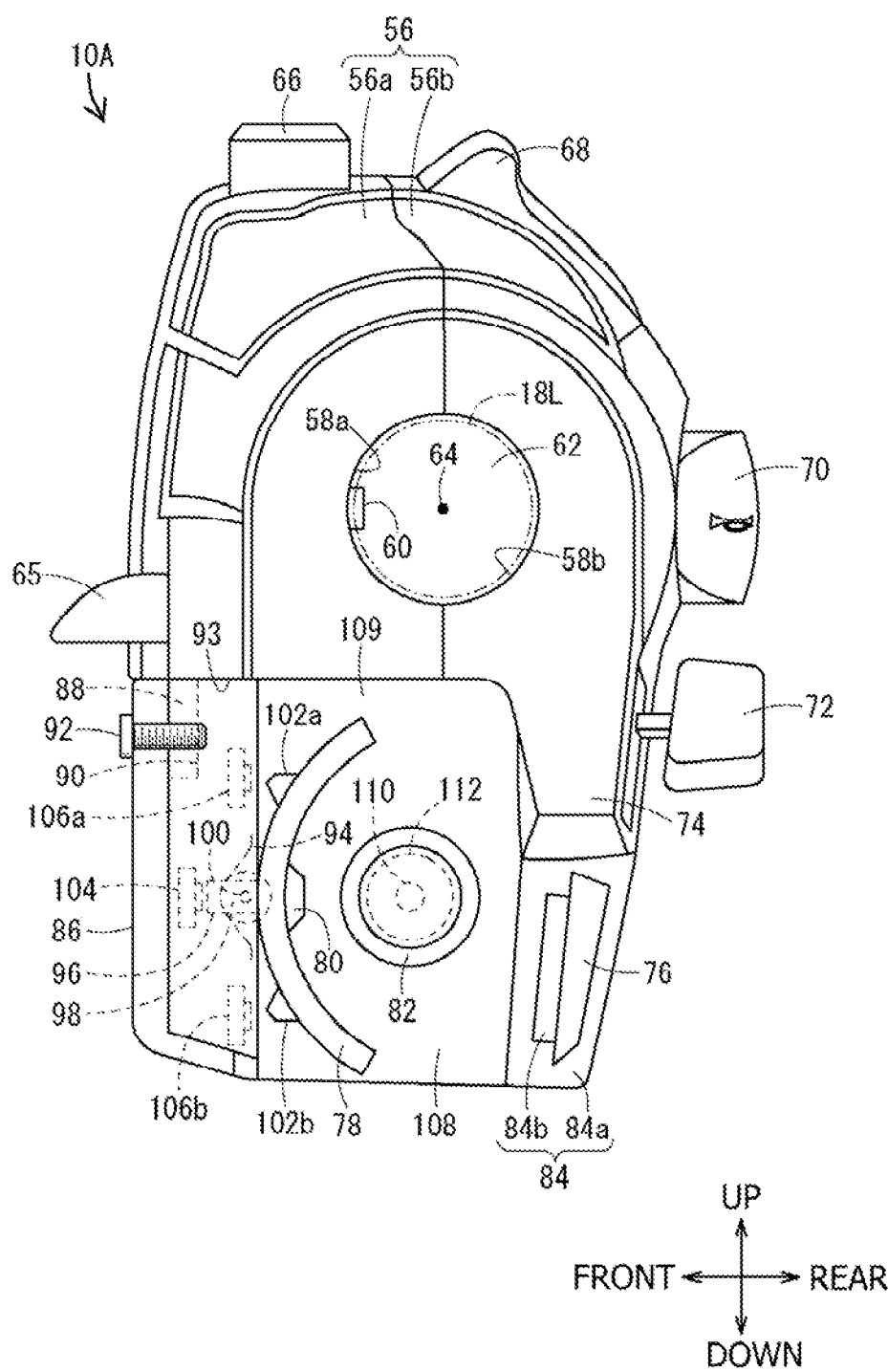
FIG. 3 is a left side view of the handle switch in FIG. 1.

The second operation element 78 does not need to have the circular arc shape shown in FIG. 3. Furthermore, it may have a V-shape in which the constituent part is inclined toward the vehicle body rear side in the directions toward the upper side and the lower side.

The third operation element 80 is provided at the center part of the rear surface of the second operation element 78 having the circular arc shape. Corresponding to such a configuration of the second operation element 78 and the third operation element 80, a push switch 104 opposed to the pressing member 96, a push switch 106a opposed to the pressing part 102a, and a push switch 106b opposed to the pressing part 102b are provided inside the second attachment part 86.

Figure 2:
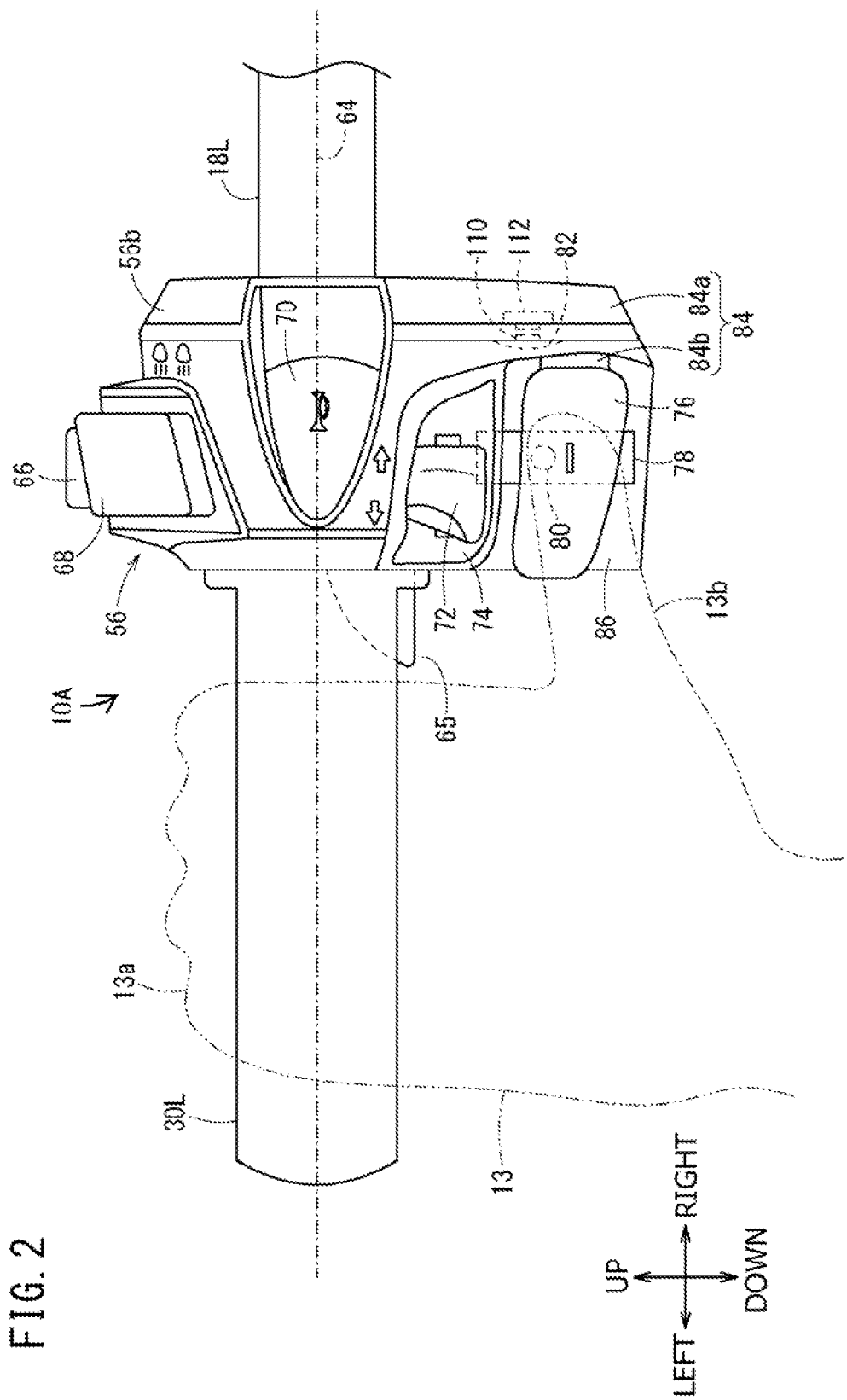
FIG. 2 is a rear view of the handle switch in FIG. 1.

In the rear view of FIG. 2, the first operation element 76 on the near side of the rider 13 and the second operation element 78 and the third operation element 80 on the far side overlap with each other. Furthermore, in the side view of FIG. 3, below the axial line 64 in the switch case 56, a space 108 having a predetermined size is formed by the bottom surface of the front case half body 56a, the bottom surface of the rear case half body 56b, the protruding part 74, and the second attachment part 86. Therefore, below the axial line 64, the first operation element 76 is disposed on the vehicle body rear side and the second operation element 78 and the third operation element 80 are disposed on the vehicle body front side across the space 108 from the first operation element 76.

An extending part 109 extending downward continuously with the extending part 84*a* is formed on the vehicle body center side of the front case half body 56*a*. In this case, in the left side surface of the extending part 109, the fourth operation element 82 is provided at a place among the first operation element 76, the second operation element 78, and the third operation element 80 in the side view of FIG. 3. A pressing part 110 having a protrusion shape is formed on the rear surface (right side surface in the direction toward the vehicle body center along the axial line 64) of the fourth operation element 82 and a push switch 112 opposed to the pressing part 110 is provided inside the extending part 109.

In the handle switch 10A, the second operation element 78 functions as a seesaw switch that swings about the center shaft 100 in order to select an operation menu of a predetermined electrical component such as the meter system 28, the navigation display system 48, and the audio unit 50. Furthermore, the third operation element 80 functions as a push switch to settle or cancel the operation menu selected by the second operation element 78. The fourth operation element 82 functions as a push switch for operating a predetermined electrical component.

In the handle switch 10A, the function of settling or canceling in the third operation element 80 may be assigned to the fourth operation element 82. The functions assigned to the first to fourth operation elements 76 to 82 can be arbitrarily set depending on the various kinds of electrical components mounted in the motorcycle 12.

Specifically, when the rider 13 inserts the thumb 13*b* into the space 108 and operates the second operation element 78, the second operation element 78, the pressing member 96, and the circular member 98 integrally swing in the upward-downward direction about the center shaft 100.

More specifically, when the rider 13 presses the upper arc part of the second operation element 78 with the thumb 13*b*, this upper arc part gets close to the rear surface of the second attachment part 86 and the pressing part 102*a* presses the push switch 106*a*. This causes the push switch 106*a* to output a predetermined signal according to the pressing from the pressing part 102*a*.

On the other hand, when the rider 13 presses the lower arc part of the second operation element 78 with the thumb 13*b*, this lower arc part gets close to the rear surface of the second attachment part 86 and the pressing part 102*b* presses the push switch 106*b*. This causes the push switch 106*b* to output a predetermined signal according to the pressing from the pressing part 102*b*.

Therefore, by supply of the signal output from the push switches 106*a* and 106*b* to e.g. the meter system 28, the navigation display system 48, or the audio unit 50, the rider 13 can select a predetermined operation menu of the meter system 28, the navigation display system 48, or the audio unit 50 in accordance with the operation of the second operation element 78.

When the rider 13 inserts the thumb 13*b* into the space 108 and presses the third operation element 80, the second operation element 78, the pressing member 96, and the circular member 98 are integrally displaced forward and the tip part of the pressing member 96 presses the push switch 104. This causes the push switch 104 to output a predetermined signal according to the pressing from the pressing member 96. As a result, by supply of the signal output from the push switch 104 to e.g. the meter system 28, the navigation display system 48, or the audio unit 50, the rider 13 can settle or cancel a selection result about the operation menu selected in advance.

When the rider 13 inserts the thumb 13*b* into the space 108 and presses the fourth operation element 82, the pressing part 110 of the fourth operation element 82 presses the push switch 112. This causes the push switch 112 to output a predetermined signal according to the pressing from the pressing part 110. As a result, by supply of the signal output from the push switch 112 to a predetermined electrical component, the rider 13 can operate this electrical component through the operation of the fourth operation element 82.

Effects of First Embodiment

As described above, in the handle switch 10A according to the first embodiment, the first to third operation elements 76 to 80 overlap with each other, as viewed the rear view of the motorcycle 12 (FIG. 2), and are each disposed in such a range as to be operable with the thumb 13*b* in the state in which the rider 13 puts the left hand 13*a* on the handle grip 30L. Since the first to third operation elements 76 to 80 are provided near the handle grip 30L as above, the operability of the first to third operation elements 76 to 80 for the rider 13 is favorable. As a result, the operability of the handle switch 10A for the rider 13 can be improved.

Specifically, in the case of a motorcycle equipped with a handle switch of a related art, the thumb 13*b* is located on the lower side of a handle grip when this handle grip is grasped. Therefore, when operating a switch provided on the near side of the rider 13 in the handle switch, the rider 13 needs to raise the thumb 13 to a large extent because the distance from the original position of the thumb 13*b* to the switch is long.

In contrast to this, in the handle switch 10A according to the first embodiment, the rider 13 can easily operate the second to fourth operation elements 78 through 82 by inserting the thumb 13*b* into the space 108 from the lower side of the switch case 56. Furthermore, the movement distance from the original position of the thumb 13*b* to the second to fourth operation elements 78 to 82 is allowed to be short, which can greatly improve the operability.

Furthermore, on the lower side relative to the axial line 64 of the handlebar 18L in the switch case 56, the first operation element 76 is provided on the vehicle body rear side and the second operation element 78 and the third operation element 80 are provided on the vehicle body front side. This allows the rider 13 to definitely distinguish the position of the first operation element 76 from the positions of the second operation element 78 and the third operation element 80. As a result, the operability of the handle switch 10A can be further improved.

In addition, the first to fourth operation elements 76 to 82 are mounted at different positions from the shift-up switch 65, the hazard lamp switch 66, the optical axis changeover switch 68, the horn switch 70, and the blinker switch 72 in the switch case 56. Therefore, it is possible to definitely separate these switches from the first to fourth operation elements 76 to 82. Thus can make the operability of the handle switch 10A more favorable.

Moreover, the first operation element 76 is an operation switch that swings about the swing axis and is so configured as to detect that the rider 13 has operated the first operation element 76 with the thumb 13*b* (that the first operation element 76 is in the operated state) when being displaced toward the vehicle body front side and not to detect the operated state when being returned to the original position on the vehicle body rear side.

Therefore, even when the thumb 13b touches the first operation element 76 from its rear side (vehicle body front side) in operation of the second operation element 78, it is avoided that the first operation element 76 becomes the operated state. This suppresses erroneous operation of the first operation element 76.

Furthermore, the first attachment part 84 is not provided in the space 108 between the first operation element 76 and the second operation element 78 and the third operation element 80, which facilitates insertion of the thumb 13b of the rider 13 into this space 108. As a result, the operability of the second to fourth operation elements 78 to 82 can be improved.

Moreover, the second operation element 78, the third operation element 80, and the second attachment part 86 can be integrally attached and detached to and from the switch case 56. Therefore, in the case in which the second operation element 78 and the third operation element 80 are unnecessary, the second operation element 78, the third operation element 80, and the second attachment part 86 may be removed from the switch case 56. This allows the handle switch 10A to have a compact configuration.

The case in which the second operation element 78 and the third operation element 80 are unnecessary is e.g. a case in which the handle switch 10A is mounted in the motorcycle 12 that is not equipped with the navigation display system 48 and the audio unit 50.

Furthermore, the third operation element 80 is provided at the center part of the rear surface of the second operation element 78, which can compactly dispose the plural operation elements.

Moreover, in the switch case 56, the fourth operation element 82 is provided on the vehicle body center side in the rear view of FIG. 2 between the first operation element 76 and the second operation element 78 in the side view of FIG. 3. This can compactly dispose the plural operation elements.

In the above description, the case is described in which the second operation element 78 is a seesaw switch to select an operation menu of the meter system 28, the navigation display system 48, or the audio unit 50. However, it is also possible to make the second operation element 78 function as a switch for operating an electrical component other than the meter system 28, the navigation display system 48, and the audio unit 50. That is, the second operation element 78 is mounted on the switch case 56 as a switch for selecting functions of various kinds of electrical components of the motorcycle 12.

Furthermore, although the case in which the second operation element 78 is a seesaw switch that swings in the upward-downward direction is described in the above description, it may be a seesaw switch that swings in the left-right direction.

In addition, although the case in which the second operation element 78 is a seesaw switch is described in the above description, the second operation element 78 may be a push switch by which various kinds of functions can be selected every time the rider 13 presses it with the thumb 13b as long as functions (operation menus) of various kinds of electrical components can be selected.

Moreover, although the case in which the switch case 56 is divided into the front case half body 56a and the rear case half body 56b is described as one example in the above description, the switch case 56 may be divided into the upper side and the lower side. Therefore, the dividing method of the switch case 56 may be any method.

In the handle switch 10A, it is also possible to utilize the second operation element 78 and the third operation element 80 as an external input interface of portable apparatus such as a smartphone equipped with a touch panel. In this case, the convenience of the portable apparatus can be greatly improved if applications for navigation and so forth in the portable apparatus can be operated by the second operation element 78 and the third operation element 80. When the second operation element 78 and the third operation element 80 are utilized as an external input interface of portable apparatus, the portable apparatus can be operated by the second operation element 78 and the third operation element 80 if wireless communications are carried out between the handle switch 10A and the portable apparatus by using a wireless technique such as the Bluetooth (registered trademark).

Description of Second Embodiment

Figure 4:
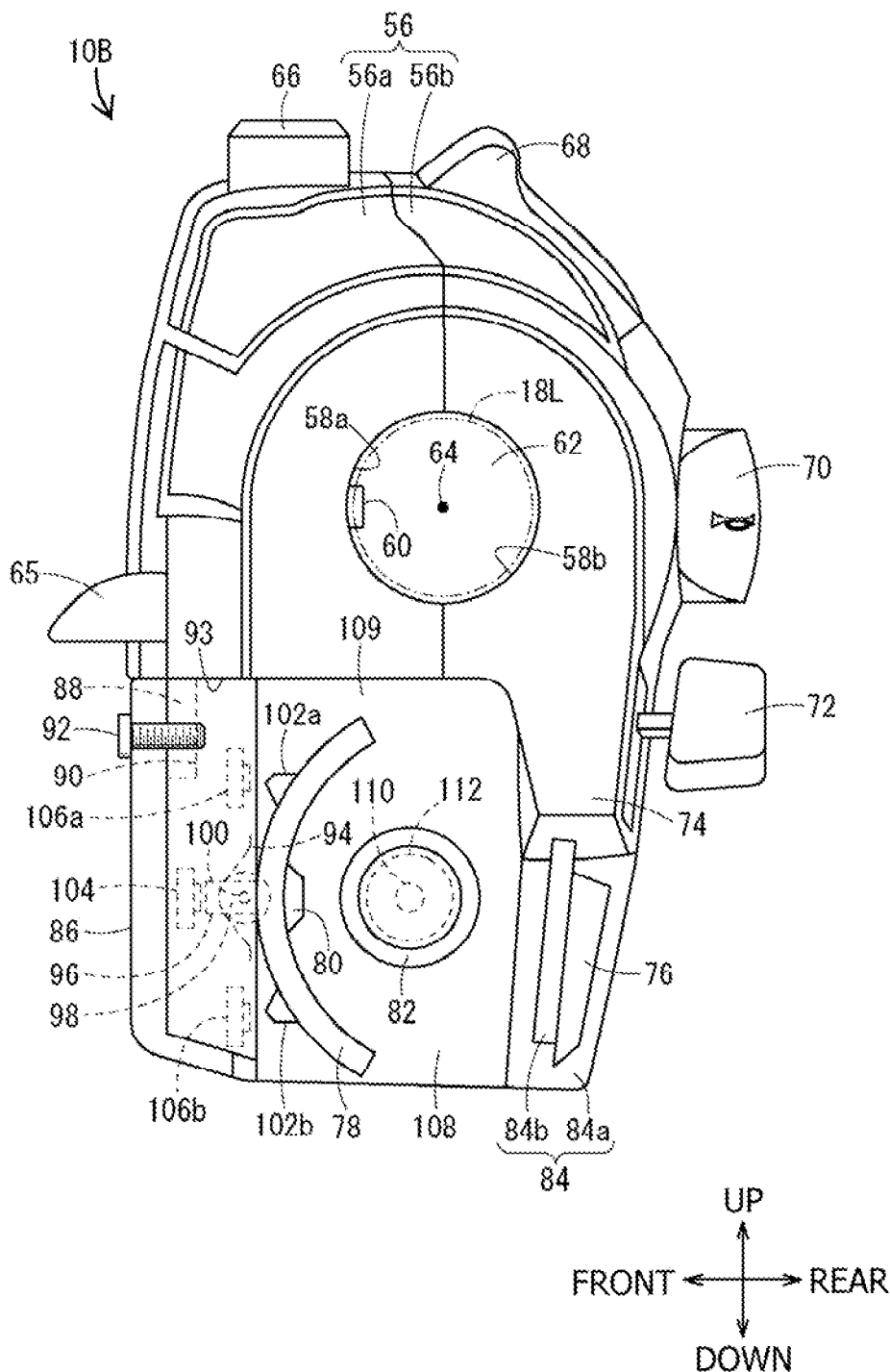
FIG. 4 is a left side view of a handle switch according to a second illustrative embodiment of the present invention.

A handle switch 10B according to a second embodiment will be described below with reference to FIG. 4. In the handle switch 10B, the same constituent elements as those in the handle switch 10A (see FIGS. 1 to 3) according to the first embodiment are given the same reference symbols and detailed description thereof is omitted. This is the same also in other embodiments subsequent to the second embodiment.

The handle switch 10B is different from the handle switch 10A according to the first embodiment in that the cantilever support part 84b droops from the protruding part 74 or the upper part of the extending part 84a to cantileverly support the first operation element 76 from the upper side.

Also in this case, the first attachment part 84 is not provided in the space 108 between the first operation element 76 and the second operation element 78 and the third operation element 80. This facilitates insertion of the thumb 13b of the rider 13 into the space 108, which can improve the operability of the second to fourth operation elements 78 to 82.

The handle switch 10B has the same configuration as the handle switch 10A except for that the cantilever support part 84b cantileverly supports the first operation element 76 from the upper side. Therefore, it is obvious that effects by the respective constituent elements of the handle switch 10A except for the cantilever support part 84b are achieved also in the handle switch 10B.

Description of Third Embodiment

Figure 5:
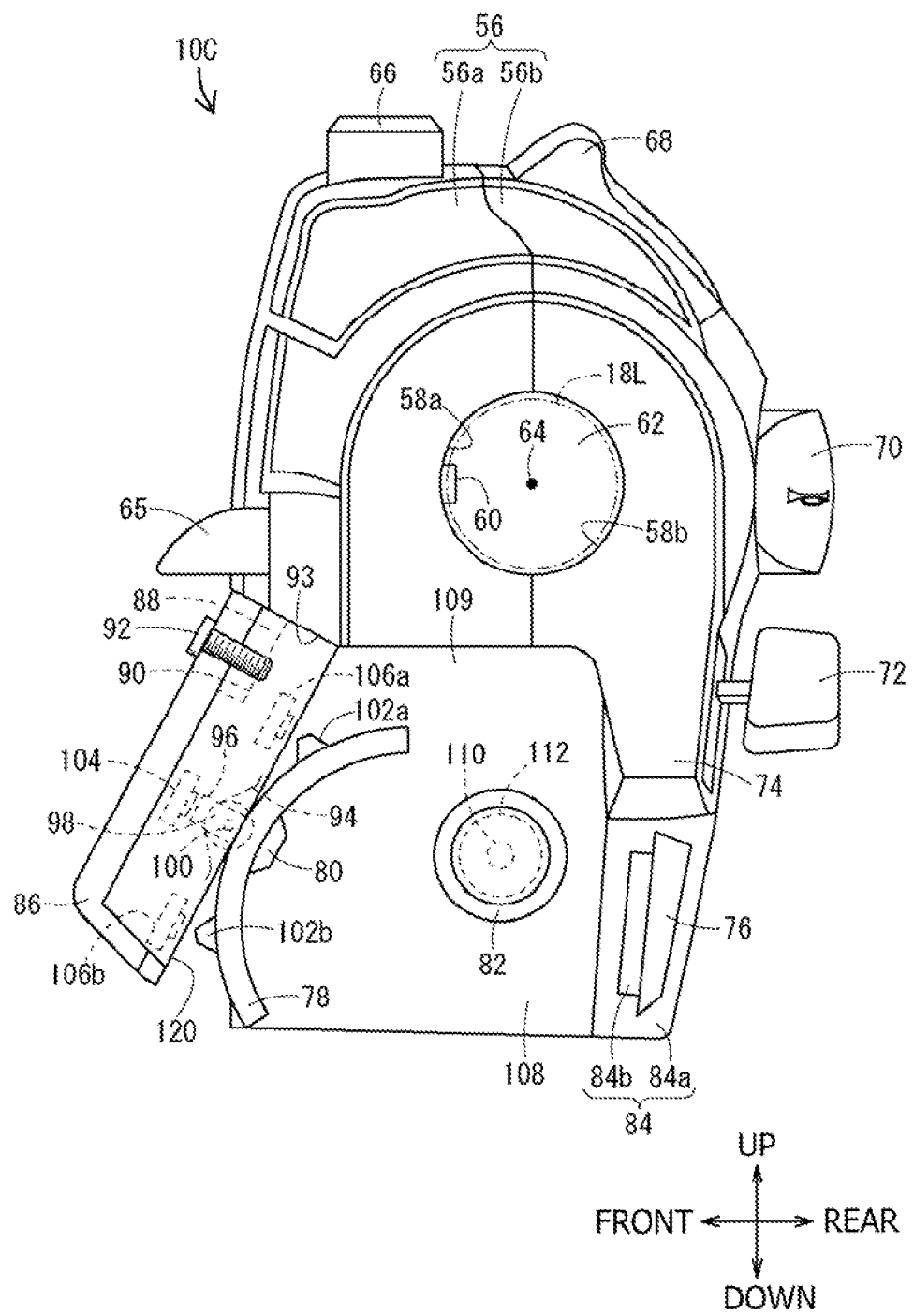
FIG. 5 is a left side view of a handle switch according to a third illustrative embodiment of the present invention.

A handle switch 10C according to a third embodiment will be described below with reference to FIG. 5.

The handle switch 10C is different from the handle switches 10A and 10B (see FIGS. 1 to 4) according to the first and second embodiments in the following point. The second attachment part 86 is attached to the switch case 56 in such a manner as to be inclined toward the vehicle body rear side in the direction toward the vehicle body upper side. Therefore, the second operation element 78 and the third operation element 80 are attached along an inclined surface (first inclined surface) 120 as the rear surface of the second attachment part 86.

In other words, in the handle switch 10C, the joining surface 93 of the front case half body 56a is so formed as to be oriented toward the lower front side obliquely and the protruding part 88 obliquely extends toward the lower front side from this joining surface 93. Thus, when the protruding part 88 is fitted to the recess 90 formed in the second attachment part 86 and the protruding part 88 and the second attachment part 86 are fastened by the screw 92, the second attachment part 86 can be so fixed as to be inclined with respect to the front case half body 56*a*.

As above, in the handle switch 10C, the second operation element 78 and the third operation element 80 are attached to the inclined surface 120 inclined toward the vehicle body rear side in the direction toward the vehicle body upper side. This facilitates insertion of the thumb 13*b* into the space 108 between the first operation element 76 and the second operation element 78 and the third operation element 80. This can further improve the operability of the second to fourth operation elements 78 to 82.

Description of Fourth Embodiment

A handle switch 10D according to a fourth embodiment will be described below with reference to FIG. 6.

The handle switch 10D is different from the handle switches 10A to 10C (see FIGS. 1 to 5) according to the first to third embodiments in the following point. The rear surface of the second attachment part 86 is formed as an inclined surface (second inclined surface) 122 inclined toward the vehicle body rear side with respect to the axial line 64 of the handlebar 18L in the direction toward the vehicle body center along the axial line 64. Therefore, the second operation element 78 and the third operation element 80 are attached along the inclined surface 122.

Also in this case, by attaching the second operation element 78 and the third operation element 80 to the inclined surface 122, insertion of the thumb 13*b* into the space 108 between the first operation element 76 and the second operation element 78 and the third operation element 80 is facilitated and thus the operability of the second operation element 78 and the third operation element 80 can be improved.

Figure 6:
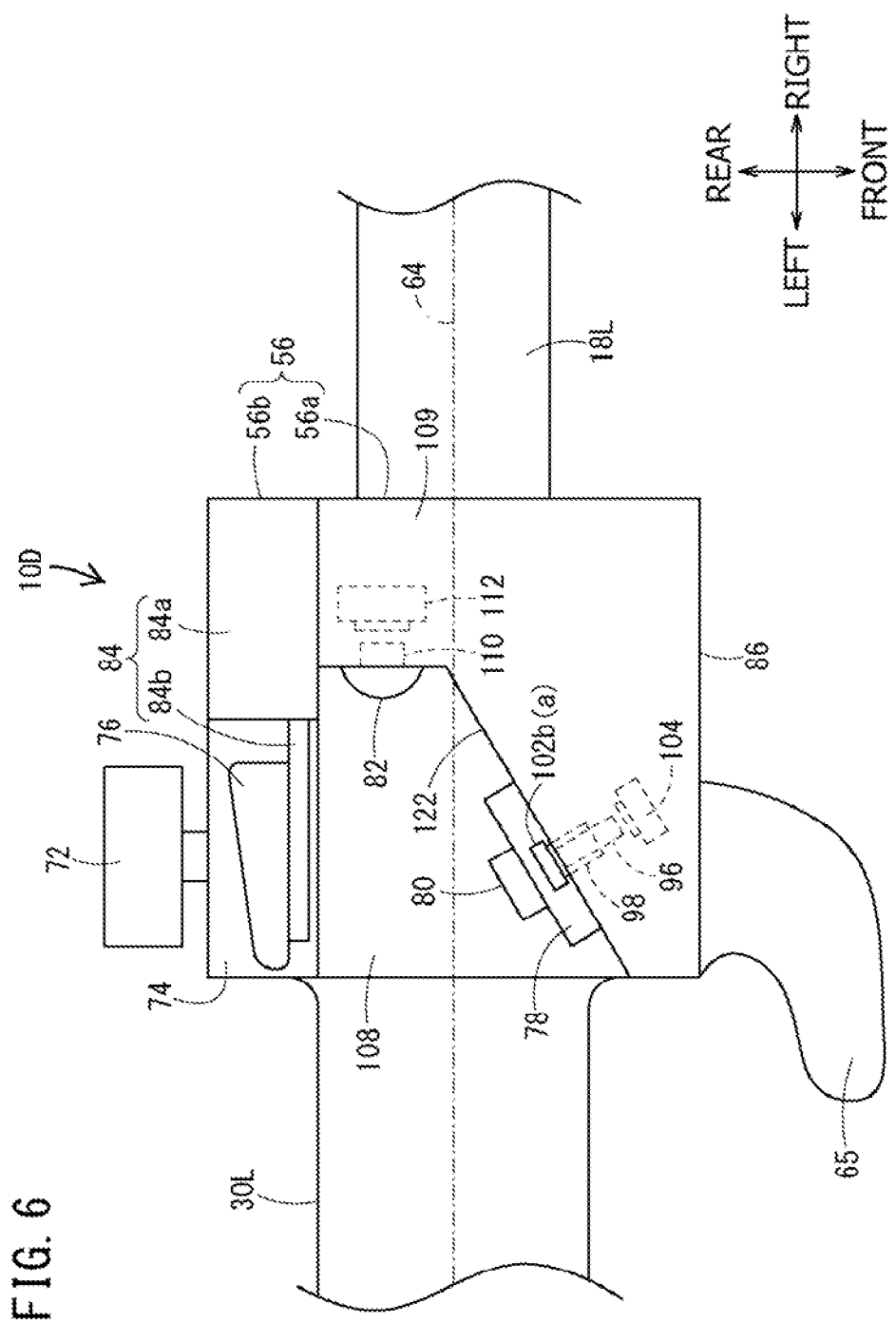
FIG. 6 is a bottom view of a handle switch according to a fourth illustrative embodiment of the present invention.

In FIG. 6, the second attachment part 86 is shown as part of the front case half body 56*a*. However, the inclined surface 122 may be formed by fixing the second attachment part 86 to the front case half body 56*a* similarly to the cases of the handle switches 10A to 10C. Furthermore, also in the handle switch 10D, the dividing method of the switch case 56 is not limited to the form shown in FIG. 6 and any dividing method may be employed.

Description of Fifth Embodiment

Figure 7:
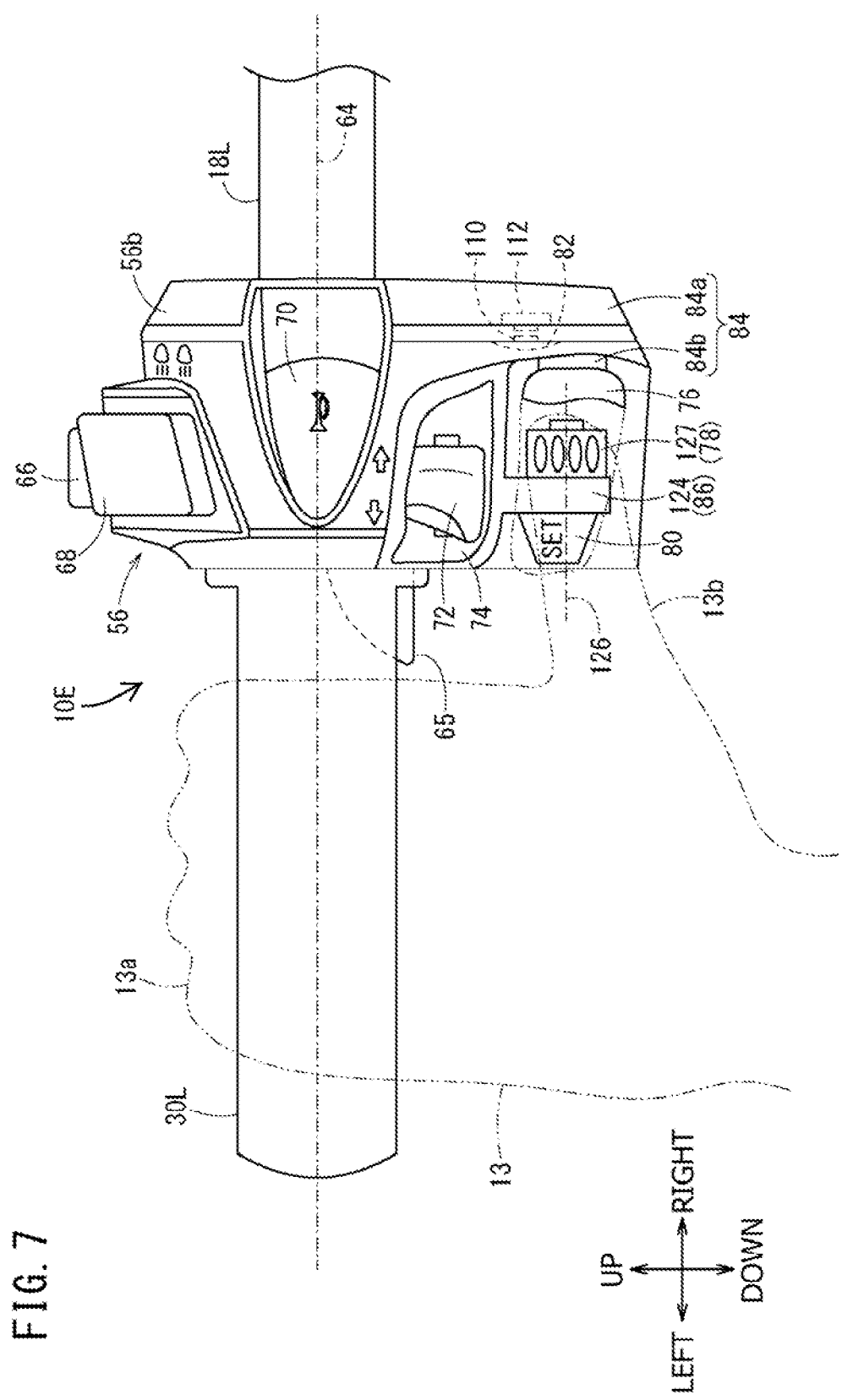
FIG. 7 is a rear view in which a first operation element is so represented as to be partially broken about a handle switch according to a fifth illustrative embodiment of the present invention.

A handle switch 10E according to a fifth embodiment will be described below with reference to FIG. 7. FIG. 7 is a rear view of the handle switch 10E in which the first operation element 76 is so represented as to be partially broken.

In the handle switch 10E, a rotary switch 127 as the second operation element 78 is attached to the right side surface of an extending part 124 drooping from the front case half body 56*a* and the third operation element 80 is attached to the left side surface. In other words, the extending part 124 functions as the second attachment part 86 for attaching the third operation element 80 and the rotary switch 127 to the front case half body 56*a*.

In the fifth embodiment, the rotary switch 127 is a switch that can rotate around a rotation axis 126 substantially parallel to the axial line 64 by operation with the thumb 13*b* of the rider 13. The third operation element 80 is a set switch (push button switch) for settling an operation menu of a predetermined electrical component selected by the rotary switch 127 by operation with the thumb 13*b* of the rider 13.

In the fifth embodiment, the rotary switch 127 rotates around the rotation axis 126 different from the axial line 64 by operation with the thumb 13*b*. This makes it possible to easily select a predetermined operation menu of an electrical component (e.g. the meter system 28, the navigation display system 48, or the audio unit 50) corresponding to the rotary switch 127 and operate this electrical component.

In the handle switch 10E, the configuration except for the third operation element 80, the extending part 124, and the rotary switch 127 is the same as the handle switch 10A. Therefore, it is obvious that effects by the configuration of the handle switch 10A except for the third operation element 80, the extending part 124, and the rotary switch 127 are also easily achieved.

In the fifth embodiment, it is also possible to make the rotary switch 127 function as the third operation element 80 by swinging it left and right along the rotation axis 126. Specifically, an operation menu selected by the rotary switch 127 may be settled by swinging the rotary switch 127 in one direction along the rotation axis 126 and a selected operation menu may be cancelled by swinging the rotary switch 127 in the other direction along the rotation axis 126.

In the fifth embodiment, the third operation element 80 is provided separately from the rotary switch 127. However, the third operation element 80 may be provided integrally with the rotary switch 127 on the rotation axis 126. In this case, the third operation element 80 may be a push switch by which a selected operation menu can be settled or cancelled every time the rider 13 presses the third operation element 80 with the thumb 13*b*.

Description of Sixth Embodiment

Figure 8:
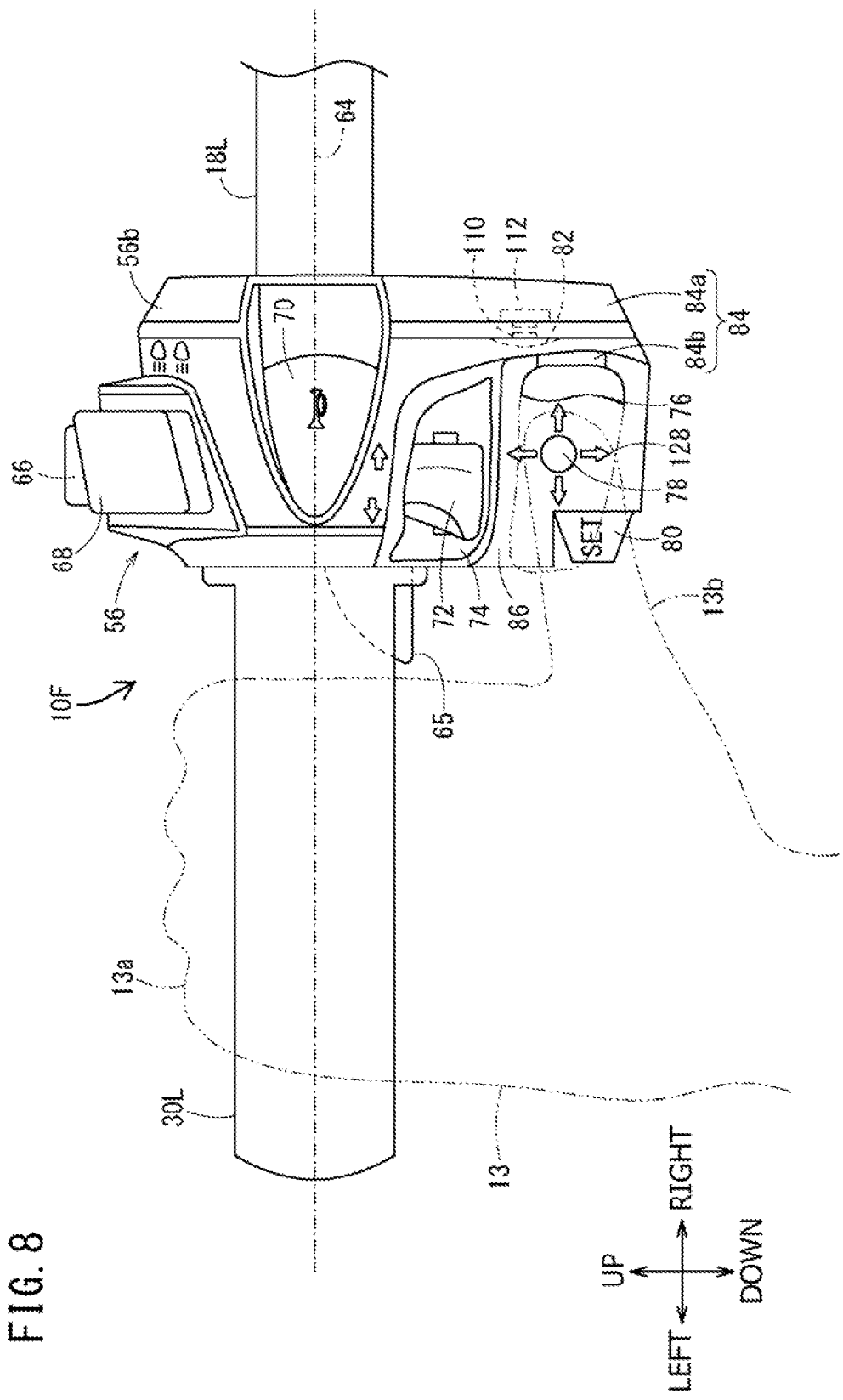
FIG. 8 is a rear view in which the first operation element is so represented as to be partially broken about a handle switch according to a sixth illustrative embodiment of the present invention.

A handle switch 10F according to a sixth embodiment will be described below with reference to FIG. 8. FIG. 8 is a rear view of the handle switch 10F in which the first operation element 76 is so represented as to be partially broken.

The handle switch 10F is different from the handle switch 10E (see FIG. 7) according to the fifth embodiment in that the second operation element 78 is a joystick that can swing vertically and horizontally by operation with the thumb 13*b* of the rider 13.

Although the case in which the second operation element 78 is a joystick is shown in FIG. 8 as one example, the second operation element 78 may be a switch of a touch panel. In this case, it is preferable that this switch is a touch panel switch of a capacitive type or a resistive film type.

In the handle switch 10F, arrow-shaped direction indicators 128 indicating the directions in which the second operation element 78 can be operated are provided around the second operation element 78 in the rear surface of the second attachment part 86. Furthermore, the third operation element 80 is attached to a place at the left corner of the second attachment part 86.

Also in the sixth embodiment, the rider 13 can easily select the function of an electrical component corresponding to the second operation element 78 and operate this electrical component by operating the second operation element 78 through operation with the thumb 13*b*. Furthermore, in the handle switch 10F, the configuration except for the second operation element 78 and the third operation element 80 is the same as the handle switch 10A. Therefore, effects by the configuration of the handle switch 10A except for the second operation element 78 and the third operation element 80 are also easily achieved.

In the sixth embodiment, the second operation element 78 is a joystick or a switch of a touch panel. Therefore, similarly to the case of the handle switch 10A, the second operation element 78 can be easily utilized as an external input interface of portable apparatus and the convenience of the portable apparatus can be further improved.

Description of Seventh Embodiment

Figure 9:
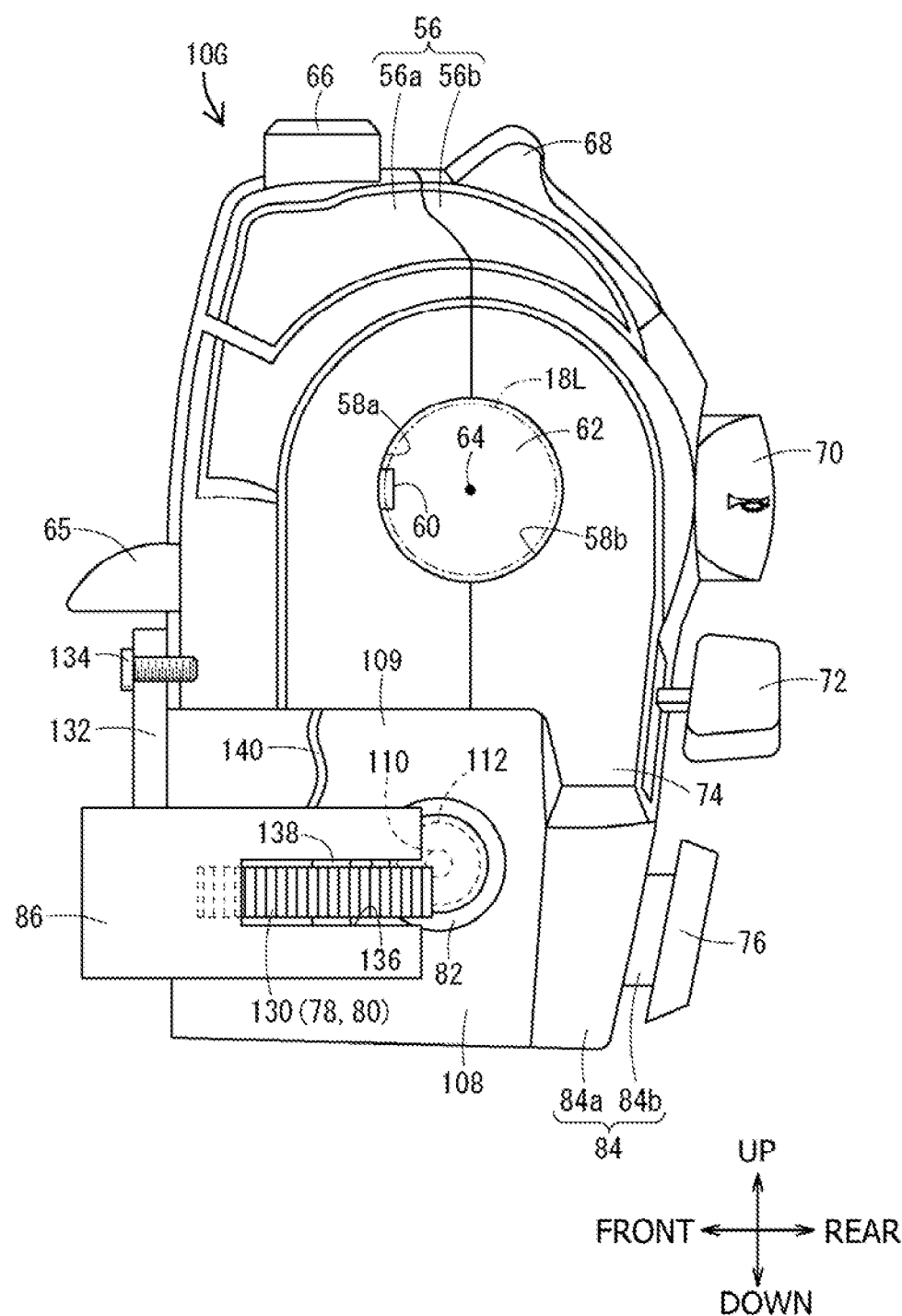
FIG. 9 is a left side view of a handle switch according to a seventh illustrative embodiment of the present invention.
Figure 10:
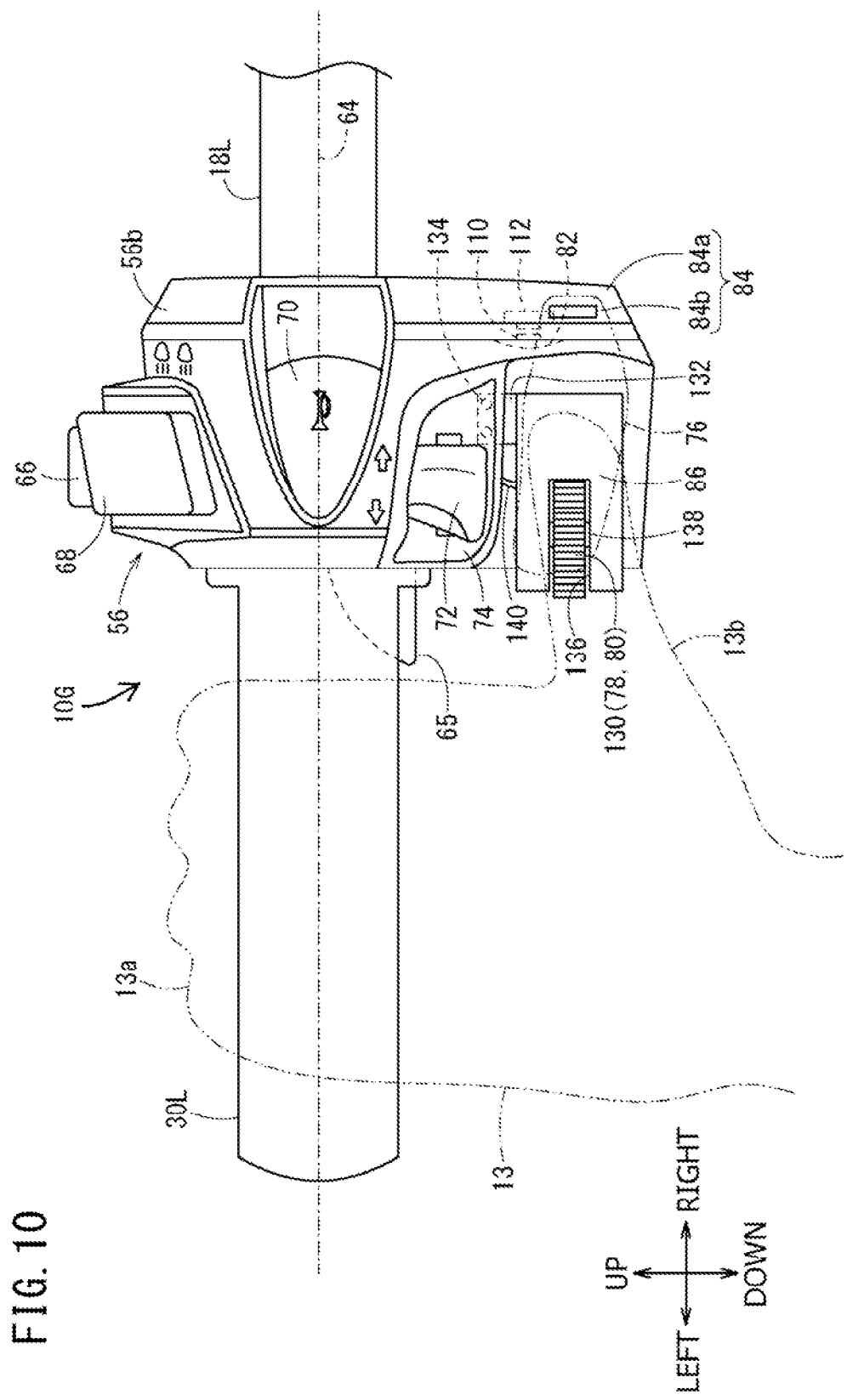
FIG. 10 is a rear view in which the first operation element is so represented as to be partially broken about the handle switch of FIG. 9.

A handle switch 10G according to a seventh embodiment will be described below with reference to FIGS. 9 to 11.

The handle switch 10G is different from the handle switches 10A to 10F (see FIGS. 1 to 8) according to the first to sixth embodiments in the following point. The cantilever support part 84b extends from the extending part 84a toward the vehicle body rear side and cantileverly supports the first operation element 76. Meanwhile, a rotary switch 130 combines the functions of the second operation element 78 and the third operation element 80.

The first operation element 76 swings in the vehicle body front-rear direction by operation with the thumb 13b of the rider 13 while being supported by the cantilever support part 84b.

The second attachment part 86 is a block to which the rotary switch 130 is attached. By fastening an extending part 132 extending upward to the front case half body 56a by two screws 134, the second attachment part 86 can be fixed to the front case half body 56a.

In this case, the left rear corner part of the block-shaped second attachment part 86 is chamfered and a recess 136 is formed along the horizontal direction. The rotary switch 130 is housed in the recess 136 from the left rear corner part of the second attachment part 86 in such a manner as to be partially exposed, and is journaled by a rotation axis 138 that is an axis different from the axial line 64 and extends along the upward-downward direction. A cable 140 for outputting a signal according to operation of the rotary switch 130 to the switch case 56 is connected between the switch case 56 and the second attachment part 86.

The rider 13 turns the exposed part of the rotary switch 130 with the thumb 13b and thereby the rotary switch 130 rotates around the rotation axis 138. This allows the rotary switch 130 to function as the second operation element 78 and can select an operation menu of an electrical component corresponding to the second operation element 78.

Furthermore, the rider 13 presses the exposed part of the rotary switch 130 with the thumb 13b toward the center of the second attachment part 86 and thereby the rotary switch 130 and the rotation axis 138 are displaced toward the inside of the second attachment part 86. This allows the rotary switch 130 to function as the third operation element 80 and can settle or cancel a selected operation menu.

Also in the seventh embodiment, because the second operation element 78 and the third operation element 80 are the rotary switch 130, the function of an electrical component corresponding to the second operation element 78 can be easily selected and settled by rotating the rotary switch 130 around the rotation axis 138 by operation with the thumb 13b. Furthermore, because the rotation axis 138 is an axis different from the axial line 64 of the handlebar 18L, the rider 13 can operate the second operation element 78 with the thumb 13b while firmly grasping the handle grip 30L with the respective fingers other than the thumb 13b. In addition, reduction in the number of parts can also be achieved because the rotary switch 130 has the functions of the second operation element 78 and the third operation element 80.

Moreover, in the handle switch 10G, the configuration except for the second operation element 78, the third operation element 80, and the second attachment part 86 is the same as the handle switch 10A. Therefore, it is obvious that effects by the configuration of the handle switch 10A except for the second operation element 78, the third operation element 80, and the second attachment part 86 are also easily achieved.

Also in the seventh embodiment, it is also possible to make the rotary switch 130 function as the third operation element 80 by swinging it upward and downward along the rotation axis 138.

Although the present invention is described above by using the preferred embodiments, the technical scope of the present invention is not limited to the described scope of the above embodiments. It is apparent for those skilled in the art that a variety of changes or improvements can be added to the above embodiments. It is apparent from the description of the scope of the claims that modes to which such changes or improvements are added can also be included in the technical scope of the present invention. Furthermore, parenthesized symbols described in the scope of the claims are given in accordance with symbols in the accompanying drawings for facilitation of understanding of the present invention and the present invention shall not be so interpreted as to be limited to the elements given these symbols.

For example, it is also possible to apply the configurations of the first to seventh embodiments to the right handle switch 36 instead of the left handle switches 10A to 10G. In this case, the first operation element 76 may be applied to the function of the traveling mode changeover switch 40 or the starter switch 46 and the second to fourth operation elements 78 to 82 may be applied to a function of operating cruise control.

The cruise control is a function to automatically control the motorcycle 12 so that the actual vehicle speed of the motorcycle 12 can become a set target vehicle speed. For operation thereof, generally plural operation elements such as an active switch of the cruise control, a cancel switch, and a target vehicle speed setting switch are necessary. For example, if the fourth operation element 82, the third operation element 80, and the second operation element 78 are applied to the active switch, the cancel switch, and the target vehicle speed setting switch, respectively, the operability of the cruise control can be greatly improved.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE SYMBOLS 10A to 10G, 36 . . . Handle switch
12 . . . Motorcycle
13 . . . Rider
13a . . . Left hand
13b . . . Thumb
18L, 18R . . . Handlebar
30L, 30R . . . Handle grip
38, 56 . . . Switch case
48 . . . Navigation display system
50 . . . Audio unit
56a . . . Front case half body
56b . . . Rear case half body
58a, 58b, 90, 94, 136 . . . Recess
64 . . . Axial line 65 . . . Shift-up switch
66 . . . Hazard lamp switch
68 . . . Optical axis changeover switch
70 . . . Horn switch
72 . . . Blinker switch
74, 88 . . . Protruding part
76 . . . First operation element
78 . . . Second operation element
80 . . . Third operation element
82 . . . Fourth operation element
84 . . . First attachment part
84a, 109, 124, 132 . . . Extending part
84b . . . Cantilever support part
86 . . . Second attachment part
92, 134 . . . Screw
96 . . . Pressing member
98 . . . Circular member
100 . . . Center shaft
102a, 102b, 110 . . . Pressing part
104, 106a, 106b, 112 . . . Push switch
108 . . . Space
120, 122 . . . Inclined surface
126, 138 . . . Rotation axis
127, 130 . . . Rotary switch
128 . . . Direction indicator

What is claimed is:

1. A vehicle handle switch for a vehicle, said vehicle comprising a handlebar and a handle grip; said vehicle handle switch being configured to fix to the handlebar together with the handle grip, said vehicle handle switch comprising:
   a case attached to the handlebar characterized in that the case has a front side and a rear side, and comprises a first attachment part and a second attachment part, wherein the second attachment part has a first inclined surface inclined toward a rear of the vehicle in an upward direction, and a second inclined surface, inclined toward the rear of the vehicle with respect to an axial line of the handlebar in a direction along the axial line of the handlebar; and
   a plurality of operation elements provided on the case, said plurality of operation elements being configured to operate a plurality of corresponding electrical components of the vehicle, said plurality of operation elements comprising a first operation element and a second operation element;
   wherein the first operation element is attached to the first attachment part, and the first attachment part is disposed at one of a plurality of positions, including a position above the first operation element in the case, and on a side of the vehicle in the direction of the axial line of the handlebar;
   wherein the vehicle handle switch is characterized in that the first operation element is provided on the case below the handlebar;
   wherein the second operation element is attached to the second attachment part along one of: the first inclined surface of the second attachment part, and the second inclined surface of the second attachment part;
   wherein the second operation element is provided on the front side of the case at a predetermined spaced position from the first operation element, when viewed in a side view of the vehicle;
   the second operation element overlaps with the first operation element, when viewed in a rear view of the vehicle; and
   the first operation element and the second operation element are disposed on the case in such an accessible range as to be operable by a rider of the vehicle with a thumb of the rider in a state in which the rider puts a hand on the handle grip.

2. The vehicle handle switch according to claim 1, characterized in that the first operation element is configured to detect that a state of the first operation element is in an operated state in which the rider has operated the first operation element with the thumb when being displaced toward a front side of the vehicle, and not to detect the operated state when being displaced toward the rear of the vehicle.

3. The vehicle handle switch according to claim 1, wherein the second operation element is attached to the second attachment part along the second inclined surface.

4. The vehicle handle switch according to claim 1, characterized in that the second attachment part is capable of being attached to and detached from the case integrally with the second operation element.

5. The vehicle handle switch according to claim 1, characterized in that said plurality of operation elements further comprises a third operation element; and the third operation element is provided on the case at a center of the second operation element.

6. The vehicle handle switch according to claim 5, characterized in that said plurality of operation elements further comprises a fourth operation element; and the fourth operation element is provided on the case between the first operation element and the second operation element in a vehicle center direction, in the direction along the axial line of the handlebar.

7. The vehicle handle switch according to claim 1, characterized in that the second operation element is a rotary switch attached to a rotation axis different from the axial line of the handlebar; and said second operation element is configured to allow operation of one electrical component of the plurality of electrical components, corresponding to the second operation element by rotating around the rotation axis.

8. The vehicle handle switch according to claim 1, characterized in that the first operation element is provided on the rear side of the case below the axial line of the handlebar, when viewed in the side view of the vehicle; and the second operation element is provided on the front side of the case below the axial line of the handlebar, when viewed in the side view of the vehicle.

9. The vehicle handle switch according to claim 8, characterized in that the first operation element is configured to detect that a state of the first operation element is in an operated state in which the rider has operated the first operation element with the thumb when being displaced toward a front side of the vehicle, and not to detect the operated state when being displaced toward the rear side of the vehicle.

10. The vehicle handle switch according to claim 8, wherein the second operation element is attached to the second attachment part along the first inclined surface.

11. The vehicle handle switch according to claim 8, wherein the second operation element is attached to the second attachment part along the second inclined surface.

12. The vehicle handle switch according to claim 8, characterized in that the second attachment part is capable of being attached to and detached from the case integrally with the second operation element.

13. The vehicle handle switch according to claim 8, characterized in that said plurality of operation elements further comprises a third operation element; and the third operation element is provided on the case at a center of the second operation element.

14. The vehicle handle switch according to claim 13, characterized in that said plurality of operation elements further comprises a fourth operation element; and the fourth operation element is provided on the case between the first operation element and the second operation element in a vehicle center direction, in the direction along the axial line of the handlebar.

15. The vehicle handle switch according to claim 8, characterized in that the second operation element is a rotary switch attached to a rotation axis different from the axial line of the handlebar; and said second operation element is configured to allow operation of one electrical component of the plurality of electrical components, corresponding to the second operation element by rotating around the rotation axis.

16. A vehicle comprising a handlebar having a handle grip and a vehicle handle switch configured to fix to the handlebar together with the handle grip, said vehicle handle switch comprising:
   a case mounted on said handlebar adjacent to the handle grip,
   characterized in that the case has a front side and a rear side, and comprises a first attachment part and a second attachment part, wherein the second attachment part has a first inclined surface inclined toward a rear of the vehicle in an upward direction, and a second inclined surface, inclined toward the rear of the vehicle with respect to an axial line of the handlebar in a direction along the axial line of the handlebar;
   a plurality of operation elements provided on the case, said plurality of operation elements being configured to operate a plurality of electrical components of the vehicle, said plurality of operation elements comprising a first operation element and a second operation element;
   wherein the first operation element is attached to the first attachment part, and the first attachment part is disposed at one of a plurality of positions, including a position above the first operation element in the case, and on a side of the vehicle in the direction of the axial line of the handlebar;
   wherein the vehicle handle switch is characterized in that the first operation element is provided on the case below the handlebar; and
   wherein the second operation element is attached to the second attachment part along one of: the first inclined surface of the second attachment part, and the second inclined surface of the second attachment part;
   wherein the second operation element is provided on the front side of the case at a predetermined spaced position from the first operation element, when viewed in a side view of the vehicle, and the second operation element overlaps with the first operation element, when viewed in a rear view of the vehicle; and
   the first operation element and the second operation element are disposed on the case in such an accessible range as to be operable by a rider of the vehicle with a thumb of the rider in a state in which the rider puts a hand on the handle grip.

17. The vehicle according to claim 16, wherein said first operation element is provided on the rear side of the case; and said second operation element is provided on the front side of the case at a position below the axial line of the handlebar, when viewed in the side view of the vehicle.

* * * * *